United States Patent
Conroy

[11] Patent Number: 5,568,900
[45] Date of Patent: Oct. 29, 1996

[54] RECEIVER HITCH SPOOLED WIRE DISPENSER

[76] Inventor: Harlan D. Conroy, 814 W. 5th St., Hardin, Mont. 59034

[21] Appl. No.: 494,799

[22] Filed: Jun. 26, 1995

[51] Int. Cl.$^6$ .................... B65H 16/06; B65H 49/00
[52] U.S. Cl. .................. 242/557; 242/403; 242/594.5; 242/598.4
[58] Field of Search .................... 242/557, 403, 242/594.5, 594.6, 597.7, 598.3, 598.4, 599.3, 129.6, 129.62, 129.5, 129, 128

[56] References Cited

U.S. PATENT DOCUMENTS

| | | | |
|---|---|---|---|
| 2,416,585 | 2/1947 | Holub | 242/557 X |
| 2,789,778 | 4/1957 | Zogg et al. | 242/403 X |
| 2,823,873 | 2/1958 | Peterson | 242/403 X |
| 2,896,877 | 7/1959 | Vaughn | 242/557 |
| 3,356,341 | 12/1967 | Brown | 242/557 X |
| 3,632,054 | 1/1972 | Heppelmann | 242/557 |
| 3,937,414 | 2/1976 | Bank et al. | 242/557 |
| 3,967,793 | 7/1976 | Walker | 242/588.2 |
| 4,042,187 | 8/1977 | Snyder | 242/557 |
| 4,946,113 | 8/1990 | Riffle et al. | 242/557 |
| 5,042,737 | 8/1991 | Sigle et al. | 242/557 |
| 5,158,243 | 10/1992 | Sigle et al. | 242/557 |

*Primary Examiner*—John M. Jillions
*Attorney, Agent, or Firm*—Risto A. Rinne, Jr.

[57] ABSTRACT

An apparatus for dispensing at least one spool of wire includes a drawbar that is adapted at one end thereof to fit into a receiver hitch of a vehicle. A cross tube is attached to the remaining end of the drawbar and includes at least one upright post that is adapted to receive the spool of wire. As the vehicle is driven forward along side a plurality of fence posts, wire is unwound from the spool and may then be secured to each of the fence posts as desired. According to a modification a pair of end supports are each attached to the cross tube at a spaced apart relationship with respect to each other. Each of the end supports includes an upright post member attached thereto. A cross tube having a pair of holes adapted to fit over each of said upright post members is included. The cross tube is inserted through a spool of wire and is then placed upon each of the pair of end supports so that each of the upright post members pass through each of the pair of holes. The wire is also dispensed when the vehicle is driven forward.

4 Claims, 1 Drawing Sheet

RECEIVER HITCH SPOOLED WIRE DISPENSER

BACKGROUND OF THE INVENTION

1. Field of the Invention

The present invention, in general, relates to apparatus used to dispense spools of wire and, more particularly, to a wire dispenser adapted for use with a vehicle receiver hitch.

Devices to dispense wire are known. Typically they are trailer towed devices. Certain other types are held by hand or require permanent attachment to a vehicle.

In general these devices are either fairly expensive to manufacture, difficult to use, or are not capable of dispensing different types of spools, or are not capable of dispensing a plurality of spools of wire simultaneously.

For example a very common type of fence wire is usually referred to as "barbed wire". To effectively contain livestock a multiple number of parallel runs of barbed wire are often installed at a predetermined spaced apart relationship from fence post to fence post for as long an overall distance as is the perimeter of the area to be fenced. Often three or four such parallel runs of barbed wire are used along the length of the perimeter of the area.

A single strand of barbed wire can be installed the length of the perimeter and then the process can be repeated as many times as is necessary for each parallel run that is required. However it is preferred to be able to install a plurality of parallel runs of barbed wire simultaneously. Accordingly, if only one traversing along the perimeter can result in the dispensing of two, three, or even four parallel runs of wire, a savings of both time and effort will result.

The need to dispense wire also applies to various types of wires used for fencing and the like that do not contain barbs. The need to dispense spooled wire includes dispensing single strands of wire and also dispensing woven wire. Woven wire is available in a spool as having various widths and lengths and is often used to fence in areas to contain smaller animals, such as dogs or other types of livestock.

As receiver hitches are in common use, a spooled wire dispenser that is adapted for use with a receiver hitch can readily be used with many vehicles. This eliminates the expense that is associated with the use of a tow dolly to support and to transport the dispenser.

Accordingly there exists today a need for a spooled wire dispenser that is adapted for use with a receiver hitch of a vehicle and is also adaptable for use with a variety of types of spools of wire.

2. Description of Prior Art

Wire dispensers are, in general, known. For example, the following patents describe various types of these devices:

U.S. Pat. No. 2,896,877 to Vaughn, Jul. 28, 1959;
U.S. Pat. No. 3,356,341 to Brown, Dec. 5, 1967;
U.S. Pat. No. 3,937,414 to Bank et al, Feb. 10, 1976;
U.S. Pat. No. 3,967,793 to Walker, Jul. 6, 1976;
U.S. Pat. No. 4,042,187 to Snyder, Aug. 16, 1977;
U.S. Pat. No. 5,042,737 to Sigle et al, Aug. 27, 1991; and
U.S. Pat. No. 5,158,243 to Sigle et al, Oct. 27, 1992.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a Spooled Wire Dispenser that is adapted to fit a vehicle receiver hitch.

It is also an object of the invention to provide a Spooled Wire Dispenser that can dispense as many spools of wire as is desired simultaneously.

Another object of the invention is to provide a Spooled Wire Dispenser that is adapted to dispense woven wire from a spool.

Still another object of the invention is to provide a Spooled Wire Dispenser that is inexpensive to manufacture.

Yet another object of the invention is to provide a Spooled Wire Dispenser that is easy to use.

Briefly, a spooled wire dispenser apparatus for use with a receiver hitch of a vehicle that is constructed in accordance with the principles of the present invention has a drawbar having a first end that is adapted to fit into the receiver hitch and a second end. The first end includes a method for securing the drawbar to the receiver hitch. The second end is attached to a method for supporting at least one spool of wire that is adapted to allow rotation thereof to occur that will dispense wire as the vehicle is driven forward providing that a first wire end of each spool is fixedly attached at a first end thereof to an object that is either not moving such as a fence post or to some other type of an object that does not have the same relative motion as does the vehicle.

DETAILED DESCRIPTION OF THE INVENTION

Figure 1:
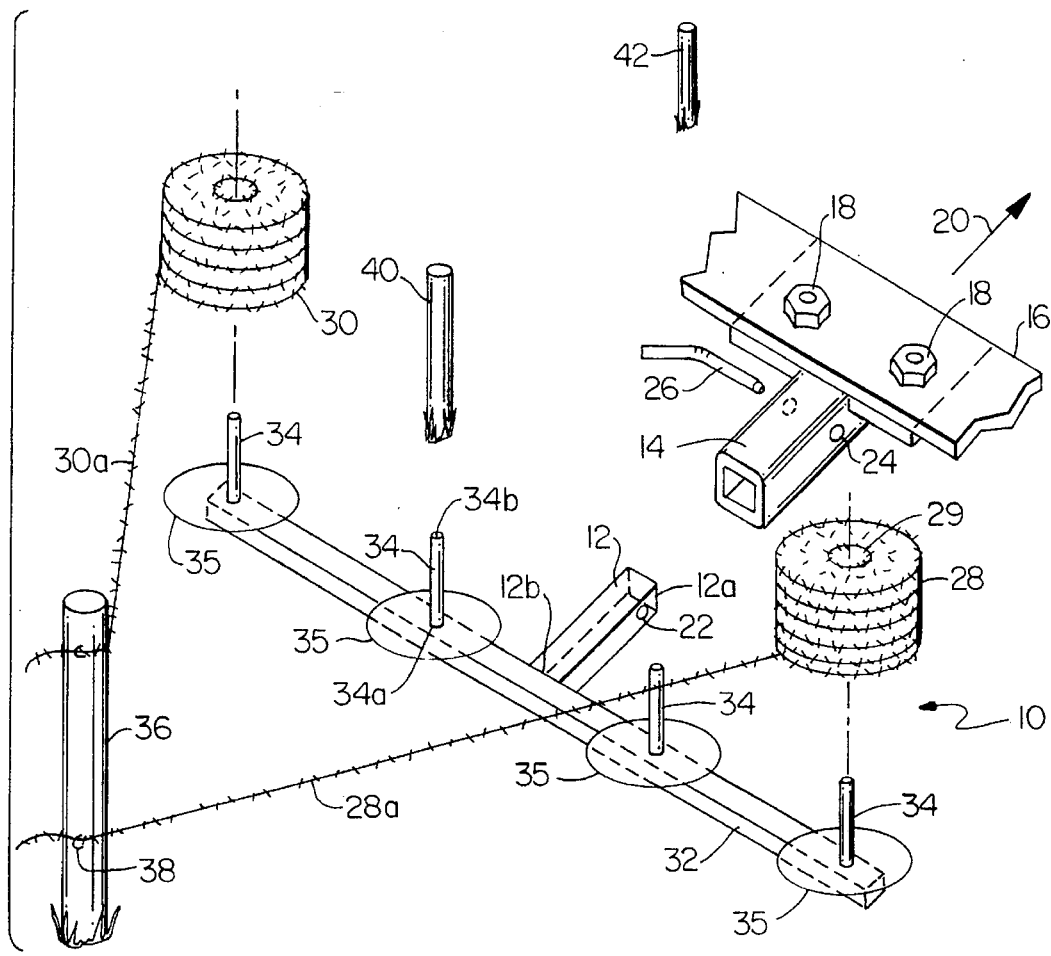
FIG. 1 is a partially exploded view in perspective of a spooled wire dispenser adapted for connection to and for use with a receiver hitch of a vehicle for dispensing a plurality of spools of wire simultaneously.

Referring primarily to FIG. 1 is shown, a spooled wire dispenser, identified in general by the numeral 10.

The dispenser 10 includes a drawbar 12 that is adapted at a first end 12a thereof for insertion into a receiver hitch 14 of a vehicle (not shown). A segment of a bumper 16 of the vehicle is shown, to which the receiver hitch 14 is attached by a pair of bolts 18. An arrow 20 is used to indicate the relative direction of travel by the vehicle when desired, as is described in greater detail hereinbelow.

In general, the requirements for the construction of the drawbar 12 for use with the receiver hitch 14 are well known and are not discussed in great detail herein. Briefly, the drawbar 12 is sized to fit inside the receiver hitch 14 and includes a hole 22 passing through the drawbar 12 that is disposed near the first end 12a thereof.

When the drawbar is properly inserted into the receiver hitch the hole 22 through the drawbar 12 aligns with a receiver hitch hole 24 that passes through the receiver hitch 14. A retaining pin 26 is then inserted through the receiver hitch hole 24 and simultaneously through the hole 22 in the drawbar 12 thus securing the drawbar in position in the receiver hitch 14. The pin 26 is usually held in place by the use of a second pin (not shown) which passes through it once it is inserted through the receiver hitch hole 24 and the hole 22 in the drawbar 12.

For purposes of clarity, FIG. 1 is shown partially exploded so as to reveal detail of construction of the dispenser 10. In particular, the drawbar 12 is shown as being disposed away from the receiver hitch 14 as is the pin 26. Similarly a first spool 28 and a second spool 30 of barbed wire are shown as being disposed above and away from the dispenser 10 so as to reveal detail of construction of the dispenser 10.

The drawbar 12 also has a second end 12b that is disposed at the end opposite to the first end 12a thereof that is attached to a cross member 32. The purpose of the cross member 32 is to provide a platform upon which at least the first spool 28 may be placed as is described in greater detail hereinbelow. The cross member 32 is disposed perpendicular with respect to a longitudinal axis of the drawbar 12.

Attached to the cross member 32 are shown a plurality of upright posts 34, each of which are attached at a first post end 34a thereof to the cross member so as to be disposed in substantially perpendicular alignment thereto and at a predetermined spaced apart parallel relationship with respect to each other.

A plurality of disks 35 are shown disposed around each of the upright posts 34 at the first post end 34a. It is a design choice as to whether the disks 35 are first attached where desired to the cross member 32 and the upright posts 34 are then attached to each of the disks 35 or whether the upright posts 34 are first attached to the cross member 32 and the disks 35 are then disposed over the upright posts 34. In the latter case the disks 35 are preferably attached to either or both of the upright posts 34 and to the cross member 32 as desired. If it is preferred the disks 35 may each be allowed to rotate on a bearing (not shown) about each of the upright posts 34.

In the description which follows, the first spool 28 is used at times for purposes of example. Based on the FIG. 1 drawing, which includes four upright posts 34 in total, the second spool 30 and up to a pair of additional spools (not shown) may also be used. However the description as it relates to the first spool 28 can be applied equally well to the second spool 30 if used and also to the pair of additional spools if they are used.

The first spool 28 includes an open center 29. The remaining end 34b of each of the upright posts 34 is open to allow placement of the open center 29 of the first spool 28 over the upright post 34 until it makes contact with and rests upon the disk 35.

Each of the upright posts 34 is similarly capable of holding the first spool 28. Thus the maximum number of spools of wire (not shown) that can be simultaneously dispensed depends upon the number and relative positioning of the upright posts 34. Of course the size of the cross member 32 is also a determinant which limits the maximum number of spools of wire because it limits the size and placement of the upright posts 34.

For example if the first spool 28 and the second spool 30 were placed on adjacent upright posts 34, there must be sufficient spacing between the upright posts 34 to ensure that the first spool 28 and the second spool 30 do not make contact with each other.

A first strand 28a of wire is dispensed off of the first spool 28 by securing the strand 28a to an object that is not attached to the vehicle, such as to a first fence post 36 by the use of a conventional fencing nail 38 or by wrapping the strand 28a around the first fence post 36 several times and then wrapping the strand 28a around itself also (not shown).

While the first fence post 36 is shown as the anchor for the end of the strand 28a, often a first brace post (not shown) is used instead to anchor the strand 28a thereto depending upon the overall length of the strand 28a when fully dispensed and also upon other factors, such as the type of livestock to be contained.

The first brace post is similar to the first fence post 36 in that it extends above the surface a similar amount, however the first brace post also includes an additional anchoring support. This support may include a cement foundation where the first brace post is inserted or a plurality of reinforcing posts (not shown) that are either attached directly to the first brace post or are disposed nearby and connected thereto by a plurality of guy wires (not shown).

The purpose is to provide a sturdy first brace post that can withstand a great force that is exerted thereto by the strand 28a as the strand 28a is stretched (as is described in greater detail hereinafter).

In the FIG. 1 drawing, the second spool 30 is similarly attached to the first fence post 36 and a second strand 30a is similarly dispensed. Accordingly for the example as shown, two of the strands 28a, 30a of barbed wire are simultaneously being dispensed from the first spool 28 and from the second spool 30.

If up to four strands (not shown) are to be simultaneously dispensed, then the pair of additional spools are used and are placed on the unused upright posts 34. Of course if a larger cross member (not shown) were used with more than the four upright posts 34, even more than four strands may be simultaneously dispensed.

According to FIG. 1, the strands are shown as being attached only to the first fence post 36. When the strands 28a, 30a are properly secured to the first fence post 36, the vehicle is then moved forward generally in the direction as indicated by the arrow 20.

The vehicle will drive as close as possible past a second fence post 40 and if desired past a third fence post 42 and also past as many intermediate fence posts (not shown) as desired. A preferred way to use the dispenser 10 is to drive past all of the intermediate fence posts until a second brace post (not shown) is reached. The second brace post serves as the anchor that allows for proper tightening of the strands 28a, 30a as is described in greater detail hereinafter.

As the vehicle moves forward both the first spool 28 and the second spool 30 rotate around each upright post 34 as required to dispense the strands 28a, 30a of wire. Each of the disks 35 provides a platform that allows rotation of the first spool 28 and the second spool 30, without encouraging either of the strands 28a, 30a to become ensnared by the dispenser 10. Accordingly the disks 35 have a dual purpose. One is to allow for the first spool 28 and the second spool 30 to rotate about the upright post 34. The other purpose is to prevent the strands 28a, 30a of wire from becoming entangled on the cross member 32.

After the vehicle stops, the strands 28a, 30a are then manually urged into contact with the second fence post 40 and are secured thereto in a manner similar to that of the first fence post 36. If desired the strands 28a, 30a are stretched tight between the first and second brace posts by using a conventional wire stretcher (not shown) and are then secured to the second fence post 40. Similarly the strands 28a, 30a are secured to the third fence post 42 and to all of the intermediate fence posts.

The materials used for all of the component parts of the dispenser 10 are as desired as are the methods whereby each component part is attached to the other. However for purpose of example, a common material for the component parts of the dispenser 10 is steel and a common method of attaching them together is by welding. The drawbar 12 must of course be sized to fit into the receiver hitch 14. Usually square steel tubing is required to accomplish this. As it is common practice to construct the receiver hitch 14 of different sizes of material stock to accommodate different towing capacities, the exact size cannot be given.

Of course if it is desired certain of the component parts may be formed as an assembly by casting or by any other process that is known or preferred. Similarly other alloys as well as synthetic materials may be used to form the component parts other than by use of the steel that is described hereinabove.

Figure 2:
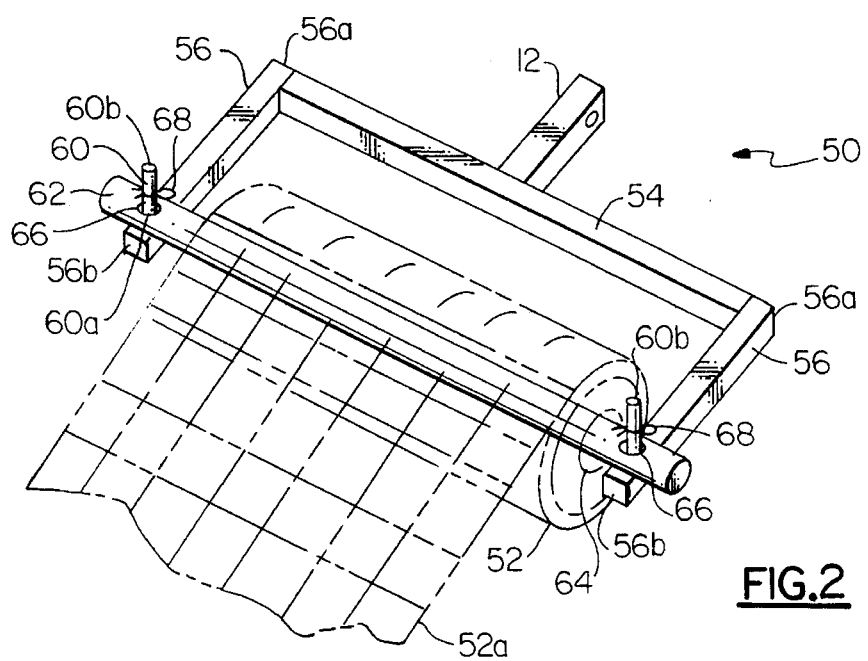
FIG. 2 is a view in perspective of a modified type of a spooled wire dispenser adapted for use with a receiver hitch of a vehicle for dispensing a spool of woven wire.

Referring now primarily to FIG. 2 is shown, a modified spooled wire dispenser, identified in general by the numeral 50 that is adapted to dispense a woven wire spool 52 therefrom. The woven wire spool 52 is shown in dashed lines so as not to obscure any of the modified dispenser 50. The modified dispenser 50 includes the drawbar 12 as was described hereinabove.

The drawbar 12 is similarly attached to a modified cross member 54. The modified cross member 54 is similar in construction and in attachment to the drawbar as is the cross member 32 that was described hereinabove, except that the modified cross member 54 is sized to whatever length is preferred to accommodate whatever is the maximum size of the woven wire spool 52 that is to be dispensed.

Attached at each end of the modified cross member 54 are a pair of end supports 56 that are disposed parallel with respect to each other. The pair of end supports 56 are each attached at a first support end 56a thereof to the modified cross member 54 and extend therefrom in a direction that is away from the drawbar 12.

The pair of end supports 56 are each disposed on a longitudinal axis that is parallel to the longitudinal axis of the drawbar 12. The pair of end supports 56 each include a second support end 56b that is disposed opposite to each of the first support ends 56a thereof.

Attached near each second support end 56b is a modified upright post 60 at an end 60a thereof and is open at a remaining end 60b thereof. Each of the modified posts 60 is disposed perpendicular with respect to a longitudinal axis of the end supports 56 and with respect to the longitudinal axis of the modified cross member 54.

During use, a cross tube 62 is placed through a longitudinal center opening 64 of the woven wire spool 52. The cross tube 62 includes a pair of holes 66 disposed on opposite ends thereof wherein each of the pair of holes 66 aligns properly with one of the modified posts 60.

The cross tube 62 (and the woven wire spool 52) is then placed so that each of the pair of holes 66 pass over each of the modified posts 60 until each end of the cross tube 62 rests on top of one of the end supports 56. Accordingly, the longitudinal axis of the woven wire spool 52 is disposed in parallel alignment with respect to the longitudinal axis of the modified cross member 54.

The woven wire spool 52 is thus held captive between each of the end supports 56 and is able to rotate about the cross tube 62 to dispense the woven wire 52a off of the woven wire spool 52 in a manner similar to that as was described hereinabove for the dispenser 10 when the vehicle is driven forward.

Each of a pair of post retaining pins 68 pass through an opening (not shown) that is provided through each of the modified posts 60. The openings are disposed generally near the remaining end 60b of each of the modified posts 60. The post retaining pins 68 are each inserted through the opening after the cross tube 62 has been placed over the modified posts 60 and on top of one of the end supports 56 thereby securing the cross tube 62 in position.

This is especially useful during transport in that should the vehicle hit a bump, the cross tube 62 and the woven wire spool 52 will not be ejected off of the modified posts 60 and thereby separated from the modified dispenser 50.

Referring now to FIG. 1 and also to FIG. 2, both the dispenser 10 and the modified dispenser 50 are elevated above a surface of the ground and are thus supported by the receiver hitch 14. Accordingly the necessity for including a wheeled type of a trailer (not shown) is obviated.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A wire dispenser adapted for use with a receiver hitch, comprising:

(a) a drawbar having a first end thereof that includes a substantially square cross section that is adapted for slideable insertion into said receiver hitch, said receiver hitch having a substantially square cross section the inside dimensions thereof being larger than the outside dimensions of said first end of said drawbar and being adapted to receive and surround a portion of said first end of said drawbar and said drawbar having a second end that is disposed opposite with respect to said first end;

(b) means for securing said first end of said drawbar to said receiver hitch when said first end of said drawbar is disposed substantially inside of said receiver hitch; and (c) means for supporting at least one spool of wire attached to said second end of said drawbar, said means for supporting adapted to permit rotation of said at least one spool of wire thereon, said means for supporting including a cross member having a longitudinal axis disposed in substantially perpendicular alignment with respect to a longitudinal axis of said drawbar and including a pair of end support members each attached to said cross member at a predetermined spaced apart relationship, each of said pair of end support members having a longitudinal axis that is disposed parallel with respect to each other and with said longitudinal axis of said drawbar and wherein said longitudinal axis of each of said pair of end support members is disposed perpendicular with respect to said longitudinal axis of said cross member and including a pair of upright post members, each of said pair of upright post members attached at one end thereof to one of said pair of end support members and including a cross tube, said cross tube including a pair of holes disposed on opposite ends thereof wherein each of said pair of holes aligns with one of said pair of upright post members, whereby said cross tube is adapted for placement on said pair of end support members and for each of said pair of upright post members to pass through each of said pair of holes.

2. The wire dispenser of claim 1 wherein said means for securing includes a hole in said first end of said drawbar adapted to align with a receiver hitch hole in said receiver hitch whereby a retaining pin is adapted for insertion through said hole and said receiver hitch hole.

3. The wire dispenser of claim 1 including means for securing said cross tube in a position of cooperation with said pair of end support members and said pair of upright post members.

4. The wire dispenser of claim 3 wherein said means for securing includes an opening disposed through each of said pair of upright post members and a post retaining pin adapted to pass through said opening.

* * * * *